US006278704B1

(12) United States Patent
Creamer et al.

(10) Patent No.: US 6,278,704 B1
(45) Date of Patent: *Aug. 21, 2001

(54) EXTENDED TELEPHONE SERVICES VIA TELEPHONE LINES SHARED FOR STANDARD TELEPHONY AND INTERNET ACCESS

(75) Inventors: Thomas Edward Creamer, Boca Raton, FL (US); Zygmunt Anthony Boleslaw Gerard Lozinski, Winchester (GB); Baiju Dhirajlal Mandalia, Boca Raton, FL (US); Pradeep Parsram Mansey, Coral Springs, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/835,148

(22) Filed: Apr. 4, 1997

(51) Int. Cl.[7] .................................................. H04L 12/66
(52) U.S. Cl. ............................................. 370/352; 370/410
(58) Field of Search ..................................... 370/352–356, 370/410, 522; 379/88.17, 93.02, 93.03

(56) References Cited

U.S. PATENT DOCUMENTS

| 5,434,797 | 7/1995 | Barris ................................ 364/514 A |
| 5,526,489 | 6/1996 | Nilakantan et al. ............ 395/200.02 |

(List continued on next page.)

FOREIGN PATENT DOCUMENTS

97/22212 * 6/1997 (WO) ............................... H04Q/3/00

OTHER PUBLICATIONS

XP002043901, Colin Low, The Internet Telephony Red Herring, Hewlett Packard, pp. 1–15, May 15, 1996.*

Primary Examiner—Chau Nguyen
Assistant Examiner—Jasper Kwoh
(74) Attorney, Agent, or Firm—Richard A. Tomlin; Robert Lieber

(57) ABSTRACT

The present invention affords a predefined class of authorized users of the PSTN (public switched telephone network) access to extended telephone services through public communication networks external to the PSTN, the latter networks including the web and Internet, in situations wherein the users have only a single telephone line that is shared for receiving both extended telephone services and standard telephone services, and wherein the extended services are deliverable while the shared line is connected to the external network. The shared line can be a line serving a residence or business establishment containing equipment for communicating through the external network(s) and equipment used in standard telephony (e.g. standard telephones, standard facsimile receivers, standard computer fax modems, etc.). The extended services can be activated automatically, by interaction between users and computer intelligence in the PSTN, without assistance from human representatives of the PSTN. Resource management intelligence of the PSTN is adapted to link to the external networks for communicating with and delivering extended telephone services to authorized users. Extended telephone services include variations of presently standard telephone services such as call waiting, caller ID, call forwarding facsimile image transmittal, voice mail, etc. Such variations are implemented by adapting computers performing resource management functions in the PSTN (e.g. programmably) to intercept telephone activities at switch ports within the PSTN, which activities are directed as standard functions to shared telephone lines instantly connected to an external network, and route transmissions associated with the extended services through the external network and shared telephone line; i.e. without interrupting the existing connection between the external network and the shared line. Thus, a user of a telephone line connected to the web or Internet can receive extended telephone services through that line without interrupting the connection to the web or Internet.

11 Claims, 8 Drawing Sheets

U.S. PATENT DOCUMENTS

| | | | |
|---|---|---|---|
| 5,572,677 | | 11/1996 | Luther et al. .................... 395/200.04 |
| 5,590,178 | * | 12/1996 | Murakami et al. ................ 379/93.18 |
| 5,602,846 | | 2/1997 | Holmquist et al. ................... 370/384 |
| 5,606,599 | | 2/1997 | O'Mahony et al. .................... 379/93 |
| 5,640,446 | * | 6/1997 | Everett et al. ........................ 379/115 |
| 5,712,903 | * | 1/1998 | Bartholomew et al. ............... 379/89 |
| 5,737,395 | * | 4/1998 | Irribarren ............................... 379/88 |
| 5,742,762 | * | 4/1998 | Scholl et al. .......................... 709/200 |
| 5,790,548 | * | 8/1998 | Sistanizadeh et al. ............... 370/401 |
| 5,805,587 | * | 9/1998 | Norris et al. ......................... 370/352 |
| 5,809,128 | * | 9/1998 | McMullin ............................ 379/215 |
| 5,818,836 | * | 10/1998 | DuVal ................................... 370/389 |
| 5,845,267 | * | 12/1998 | Ronen ...................................... 705/40 |
| 5,852,656 | * | 12/1998 | Sato et al. ......................... 379/93.21 |
| 5,917,817 | * | 6/1999 | Dunn et al. .......................... 370/352 |
| 6,028,917 | * | 2/2000 | Creamer et al. ................ 379/100.01 |

\* cited by examiner

20 — Without present adaptation, telephone services assigned to base line 2 are confined only to PSTN resources 22 — With adaptation, PSTN can provide (authorized) user of line 2 with extended telephone services, at computer connected to external network (e.g. local computer 5 or remote computer 18, Fig. 1)

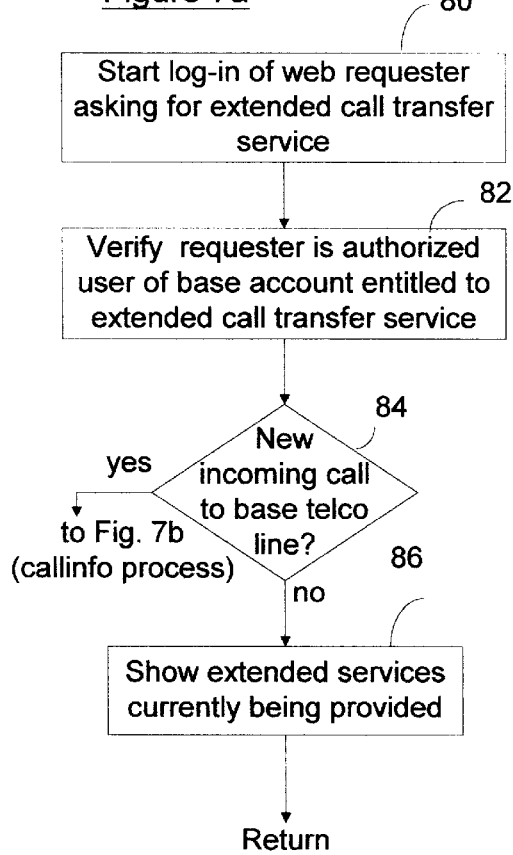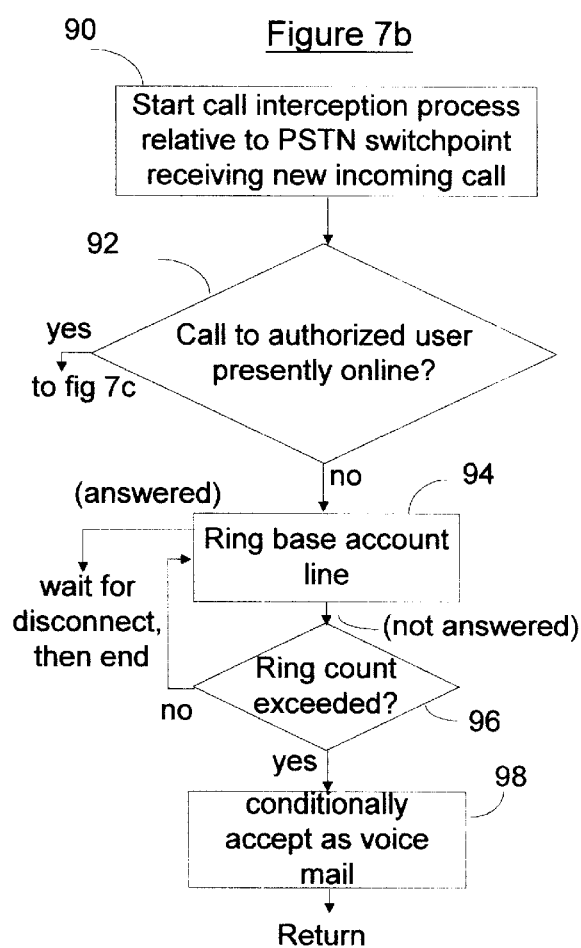

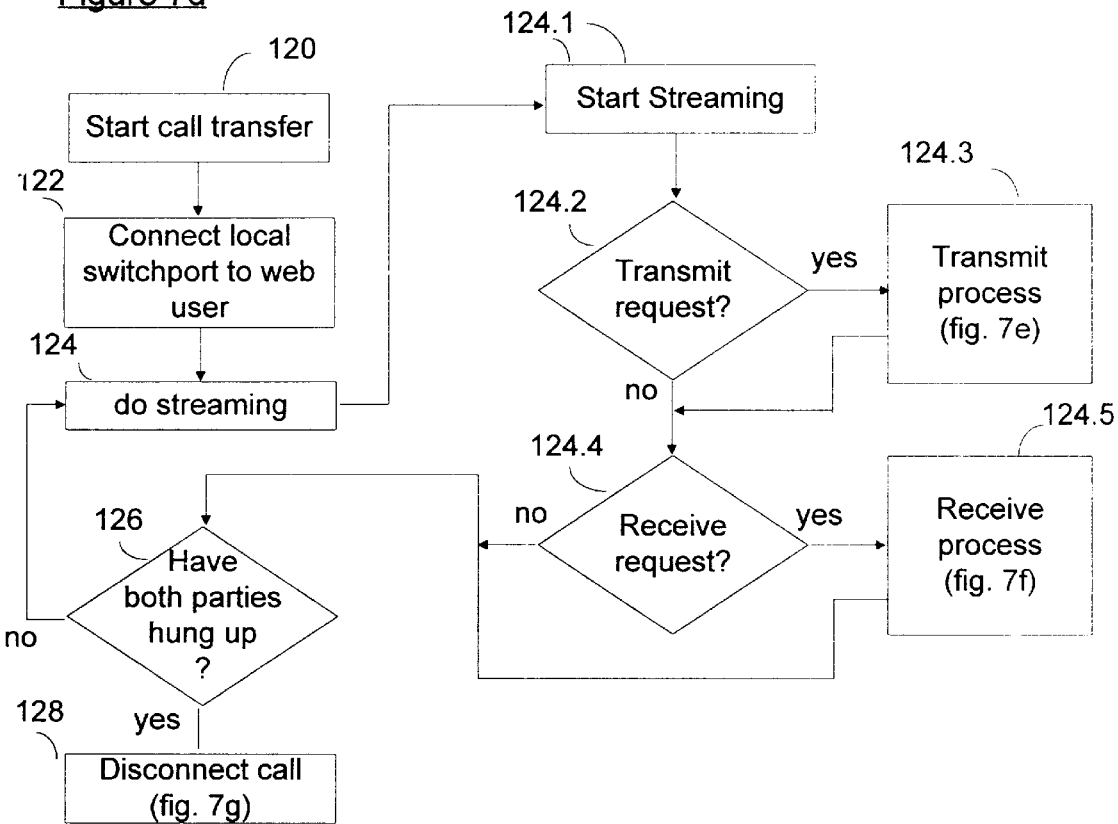

EXTENDED TELEPHONE SERVICES VIA TELEPHONE LINES SHARED FOR STANDARD TELEPHONY AND INTERNET ACCESS

CROSS-REFERENCES TO RELATED APPLICATIONS

1. Patent application Ser. No. 08/792,018 (BC9-96-073) by D. L. Acker et al, filed Feb. 3, 1997 and titled MULTI-SERVICE PLATFORM ARCHITECTURE FOR TELEPHONE NETWORKS, discloses an intelligent peripheral multiprocessor system for control of call processing and user services in the public switched telephone network (PSTN). That system is shown in the referenced application as representing a component of control in a larger regional system conforming to the AIN (Advanced Intelligent Network) architecture now becoming standard in the PSTN. The present invention is directed to an improved application for regional AIN centers of the PSTN, which would operate most efficiently in an AIN center containing an intelligent peripheral component subsystem of the type disclosed in the referenced application.

2. Patent application Ser. No. 08/803,407 (BC9-96-076) by B. D. Mandalia et al, filed Feb 20, 1997 and titled MULTIMEDIA WEB PAGE APPLICATIONS, discloses a system for adapting AIN intelligence to distribute signals originating as telephone fax transmissions to selected parties via the Internet/web. The present application is related in that it concerns an application for adapting AIN intelligence to selectively distribute telephone signals other than fax signals through the web; specifically, signals pertaining to telephone line services and associated service functions.

3. Patent application Ser. No. 08/761,257 by J. M. Dunn et al, filed Dec. 6, 1996 and titled USER INVOCATION OF SERVICES IN PUBLIC SWITCHED TELEPHONE NETWORK VIA PARALLEL DATA NETWORKS, discloses a system for enabling users of telephone lines in the PSTN to operate via computers and a data network parallel to respective telephone lines (e.g. the Internet or web) to communicate with AIN intelligence of the PSTN for controlling services applicable to respective telephone lines.

4. Patent application Ser. No. 08/761,249 by J. M. Dunn et al, filed Dec. 6, 1996 and titled MULTIMEDIA CONFERENCING USING PARALLEL NETWORKS, discloses a system for enabling participants in a voice telephone conference on the PSTN to exchange document image data during the conference and vary parameters of the conference (e.g. add and drop participants), via a parallel data network such as the web, wherein the administration of the conference parameters is accomplished through data communications with AIN intelligence over the external data network.

5. Patent application Ser. No. 08/835,147 (BC9-97-002) by T. Creamer et al, filed Apr. 4, 1997 entitled ACCESS TO EXTENDED TELEPHONE SERVICES VIA THE INTERNET, describes provision of extended telephone services to telephone system users through computers linked to the public telephone network through a network external to the telephone system such as the web or Internet; the present application concerns a species of the invention generically described in this reference.

DEFINITION OF TERMS USED IN THIS APPLICATION

For this application, the following definitions apply:

The PSTN is the aggregate of all instrumentalities providing and managing telephone call connections between members of the public at large, but excluding instrumentalities that are restricted to special groups of users; e.g. PBX's, Centrexes, etc.

A "base telephone account" is an account assigned to a specific customer of the PSTN; an example of such an account would be an account to which telephone calls associated with a specific telephone line are charged (including calls originating at the respective line and calls to that line with reversed charges).

An "authorized user" of a base telephone account is either the customer to whom the account is assigned or a party authorized by the customer to administer and use telephone services to which the account is subscribed (both standard services and extended services).

Standard telephone services are telephone service delivered to users of the PSTN through transmission routes that are entirely internal to the PSTN.

Extended telephone services, newly defined here, are telephone services delivered to users of the PSTN through transmission routes that are partially internal to the PSTN and partially external to the PSTN (e.g. telephone services involving transmissions between switch ports within the PSTN and a computer via the web or Internet).

BACKGROUND OF THE INVENTION

This invention pertains generally to provision of extended telephone services as defined above to computers linked to the PSTN through data communication networks external to the PSTN (e.g. the web, Internet, satellite radio networks, etc.), and particularly to delivery of such services only while the computer is connected to the PSTN through the external network and a telephone line which is shared for standard telephony (e.g. which is connectable to standard telephone instruments in the same premises as the computer). Certain of the extended telephone services considered herein enable an authorized user of the shared telephone line to learn of and react to standard telephone call activities waiting for connection to the shared line. Other extended telephone services considered herein enable the user to conduct telephone call activities through their computer and the shared line while the connection to the connection to the PSTN through the external network is active. Other extended telephone services enable the user to receive other telephone transmissions through their computers, the external network, and the shared line; e.g. transmissions of recorded information such as voice-mail messages and facsimile images. Extended telephone services presently considered may (but need not necessarily) comprise delivery of variations of standard telephone services (e.g. variations of standard call waiting and standard caller ID, as described below) through networks external to the PSTN (e.g. the web or Internet, satellite radio networks, etc).

In today's PSTN, end users of standard telephone services (as defined above) have limited options for varying and utilizing respective services.

Parameters relevant to delivery of a standard telephone service can be modified by an authorized end user, but delivery of the respective service invariably remains confined exclusively to the PSTN. For example, parameters of a standard service such as call forwarding can be modified to provide AIN intelligence of the PSTN with a series of telephone numbers within the PSTN that represent alternate forwarding destinations for forwarded calls directed to a telephone line associated with a given base account are to be routed, but connections to these alternate destinations would in today's technology be confined entirely to the PSTN, and forwarding of calls to these alternate destinations would have limited options for screening by intended recipients (such screening of rerouted calls being afforded by present extended services).

It has been suggested previously to use computers linked to AIN intelligence, through the Internet or web, to vary parameters of telephone services (reference the co-pending application by J.

M. Dunn et al, cross-references 3 and 4 above). But services associated with such varied parameters are generally standard services, rather than extended services within the present context of definition, and would be delivered with limited flexibility in respect to enabling intended recipients to screen and selectively accept telephone call activities associated with the services (e.g. a call forwarded by standard call forwarding procedures generally would not be screenable by the intended recipient to determine its importance or urgency).

A standard service like "call waiting" can be administered (enabled and disabled) for individual calls originating at a line associated with a base telephone account (e.g. by dialing or tone signalling the characters "*70" before entering other characters representing a called number. It has been suggested to allow for this type of service to be subject to administration through computers and networks external to the PSTN, such as the web or Internet, so that the term of enablement or disablement could be varied for more than a single call (refer to Dunn et al cross-reference 3 above), but without altering the essential context of delivery of such service; i.e. the service, when enabled, would be delivered exclusively through the PSTN with a standard form and context.

Our discovery in this regard is the recognition of the existence of (a previously unrecognized) need for delivery of extended telephone services to telephone system users, through communication networks external to the PSTN, wherein the users' connection to the external network is through a telephone line that is shared for presently standard telephone communication functions.

One example of a needed but hitherto unavailable extended service of this kind is an extended call waiting service to be described below, that is useful to indicate that telephone call activities (standard or non-standard) are currently waiting for connection to the shared telephone line while the same line is actively connected to the PSTN via the external network (e.g. while a computer is using the shared line to access the web and a PSTN server interfacing to the web).

Another example of a needed but hitherto unavailable extended telephone service of this kind is an extended caller ID service to be described that is useful to transmit indications of waiting call origins through the external network connection occupying the shared line, and is thereby useful to enable recipients of the indication to evaluate the importance or urgency of waiting call activities without requiring the connection to the external network to be interrupted or terminated.

Another example of a needed but hitherto unavailable extended service is an extended call transfer service for delivering telephone call activities originating within the PSTN directly to a computer, via an external network such as the web or Internet and a shared telephone line sustaining the external connection, in a form useful by both the computer and the external network, and for providing such delivery without requiring interruption or severance of the connection between the computer and the respective external network.

Another example of a needed but hitherto unavailable extended service is an extended voice-mail service useful for delivering voice-mail messages recorded within the PSTN to a computer, via an external network and shared telephone line, in a form which doesn't require interruption or severance of the connection between the computer and external network.

Another example of a needed but hitherto unavailable extended service is an extended fax transfer service useful for transmitting images generated by standard facsimile equipment through the PSTN and external network to a computer connected to the external network through a shared line.

Those skilled in the art will readily appreciate, from these examples, and from the descriptions to follow that there are many other existing or potentially useful telephone services that could be advantageously extended in this manner.

SUMMARY OF THE INVENTION

The present invention seeks to broaden service options available to authorized users of telephone lines associated with base telephone accounts as defined earlier, wherein respective lines are shared for connecting equipment other than standard telephone instruments to networks external to the PSTN (e.g. for connecting computers to the web and Internet) and for (time) separately connecting standard telephone equipment directly to telephone call transmission routes internal to the PSTh. The service options are broadened by providing extended telephone services, through such shared lines and external networks, the need for which is recognized presently but had not been recognized (or satisfied) previously. Such extended services may be, but need not necessarily be, variations of existing standard telephone services (refer to earlier definitions of both standard and extended services).

The invention also seeks to provide a service capability, for resource management intelligence in the PSTN, that expands the type and character of services that may be provided to authorized users of base accounts of the PSTN which are eligible to receive both standard telephone service and extended telephone service over a single telephone line.

In accordance with the invention, extended telephone services are made available to authorized users of base telephone accounts in the PSTN. These services involve communications with users through networks external to the PSTN (e.g. the web and Internet). These services may be variations of standard telephone services or functions having no counterparts in existing telephony. Communications of both standard and extended services are controlled by resource management intelligence within the PSTN. However, where communications of standard services are wholly confined to the PSTN, communications of extended services span networks that are partially internal to the PSTN and partially external to the PSTN.

Presently contemplated extended telephone services are provided to authorized users of base telephone accounts (i.e. individuals whose status as authorized users are subject to authentication prior to delivery of respective services). Resource management intelligence providing extended telephone services preferably is configured in accordance with the principles of architecture disclosed in the application by Acker et al referenced earlier; and preferably implemented by programmable adaptations of "voice peripheral" processors (VPs) of the type disclosed by Acker et al (i.e. having specific responsibility for delivery of telephone related services and voice announcements. It is understood however that other types of resource management systems and processing components thereof may be used for the same purposes.

VP's and other processors are discrete components of multiprocessor intelligent peripheral (IP) systems used at regional telephone switching nodes of the PSTN. In the configuration taught by Acker et al, individual processors in an IP system have specialized responsibilities, and VP's are responsible for administration and delivery of telephone services. In a preferred implementation of presently contemplated extended services, a server within an IP system, at a PSTN node directly serving base accounts within a predefined geographic region, interfaces the respective node to networks external to the PSTN (e.g. the web, Internet, satellite radio system, etc.). In cooperation with a VP in the respective region, the server provides a communication interface to the external networks by means of which telephone calls and extended services related thereto can be routed to PSTN users while the latter are actively connected to the external networks. Where necessary, signals transferred at this interface are suitably converted to forms compatible with the networks receiving them.

As an example, voice signals directed from a PSTN switch port to the web are converted to a compressed digital form common to other web transmissions, and voice signals received from the web are converted to a form (e.g. a standard analog form) suited to internal requirements of the PSTN. Typically, these signals are sent to and received from a PSTN users computer that is currently connected to the server via the web, and typically such a computer would have multimedia adaptation, a currently active state-of the-art web browser, and a currently active state-of-the-art telephone application for converting compressed digital voice signals received from the web to a form suitable for audible reproduction and converting audible voice entering the computer into a compressed digital form suitable for web transmission.

As another example, delivery of an extended version of today's "standard" call waiting service through the web involves transfer of call waiting indications from an internal switch port in the PSTN (specifically, in the PSTN region providing the service) to the web, for routing by the latter network to a PSTN users computer equipped as above and currently connected to the server via the web. Thus, at the server interface to the web, the signals representing call waiting indications would be converted to a digital form suitable for transmission to a computer web browser, and for causing the browser to emit a corresponding indication (e.g. a visible one, such as a blinking icon, or an audible one to be generated at a peripheral loudspeaker).

In accordance with the present invention, the PSTN user receiving extended services is connected to the PSTN server via an external network and a telephone line that is providing dual functions of connecting standard telephones directly to the PSTN and computer equipment to the web (at different times). This line may for example be a connection from the PSTN to an office or residence housing a standard telephone and a computer.

Thus, the extended call waiting indications mentioned above enable a user of the foregoing computer to recognize that standard telephone call traffic is waiting for connection to the line currently providing access to the web and PSTN server.

Another example of extended service, of a type presently contemplated and useful in association with "extended call waiting", is extended "caller ID". In this service, signals indicating origins of waiting calls, the latter directed to a telephone line having dual usage (for standard telephony and web access), are redirected to the user of the service, through the PSTN server, the web, the dual usage line, the user's computer and a web browser running on the computer. The caller ID indications received at the computer are displayed on the computer's monitor in a suitable alphanumeric form, providing a basis for enabling the user to assess the relative importance or urgency of individual waiting calls.

Another example of extended service, useful in conjunction with extended call waiting and extended caller ID, is extended call transfer. In this service, an authorized user of the service—operating through a computer and the web—indicates acceptance of a waiting call (e.g. by clicking on a "hyperlinked" display icon representing the call). In response, the VP handling the service connects the (regional) PSTN switch port receiving the accepted call to the user's "online" computer (through the PSTN server, the web, and the dual usage telephone line). Voice signals of the accepted call are converted to suitable forms; signals sent from the PSTN to the web being converted to a compressed digital form suited to web transmissions, and signals sent from the web to the PSTN being converted to a form suited to transferal through the PSTN switch port (e.g. a standard analog form). The same voice signals are routed in a routine manner between the PSTN switch port and the calling party. At the computer attached to the web, the voice signals are converted between the compressed digital format of the web and the forms required for audible reproduction, e.g. by means of a state-of-the-art "Internet Phone" software application.

Another example of extended service is extended voice mail. In this service, a waiting call is connected to a PSTN voice mail service in which, with guidance from a recorded announcement, the caller leaves a recorded message that is stored at the regional center providing the service. The recorded message is later delivered to the intended recipient through the PSTN server, the web, the dual usage line, etc. The transmitted message is handled in the same manner as voice signals sent from the PSTN to the user via extended call transfer. A variation of this service could be used to deliver other recorded information (e.g. recordings of educational materials) to users of the variation service.

Another example of extended service in accordance with this invention, termed "extended fax transfer", is useful to route facsimile signals generated by standard analog equipment to an "online" computer of an authorized user of the service, via the web. In this operation, signals representing the originally transmitted image are converted (e.g. by a VP) to a digital form best suited to presentation at an online computer, e.g. to an HTML (Hypertext Markup Language) format of the type now widely used by computer web browser software. Thus, the received image could be selectively handled in the same manner as other web communications; e.g. viewed immediately, stored in the computer (e.g. in the browser's cache) for later viewing, or printed. This enables the user of the service to receive images through their online computer, in lieu of having to use standard telephony and analog fax reception equipment and/or having to use specialized fax modem software which might not be as easy to use as the web browser receiving the extended fax transfer service and might not present the image in as pleasing a form as extended fax transfer.

From the foregoing and what is to follow, other extendable telephone services—both variations of existing standard telephone services and services rendered practical solely by virtue of the extended usage presently taught—will readily occur to those skilled in the telephony management arts.

To provide for presently contemplated extended telephone services, computer components of resource management networks within the PSTN—particularly, voice peripheral (VP) computers that are components of intelligent peripheral (IP) multiprocessor networks of a type disclosed by Acker et al in their previously cross-referenced patent application—are adapted (e.g. programmably) to interface between switch ports within the PSTN and networks external to the PSTN (e.g. the web, Internet, satellite radio systems, etc.), and to perform administrative and communicative functions requisite to respective services. These functions will be understood from the description to follow.

The foregoing and other features, benefits, advantages and potential uses of the subject invention will be more fully appreciated from the following description.

BRIEF DESCRIPTION OF THE DRAWINGS

FIGS. 7a to 7g, considered together, constitute a flow diagram showing details of implementation of extended call transfer service.

DETAILED DESCRIPTION

Figures 1, 2:
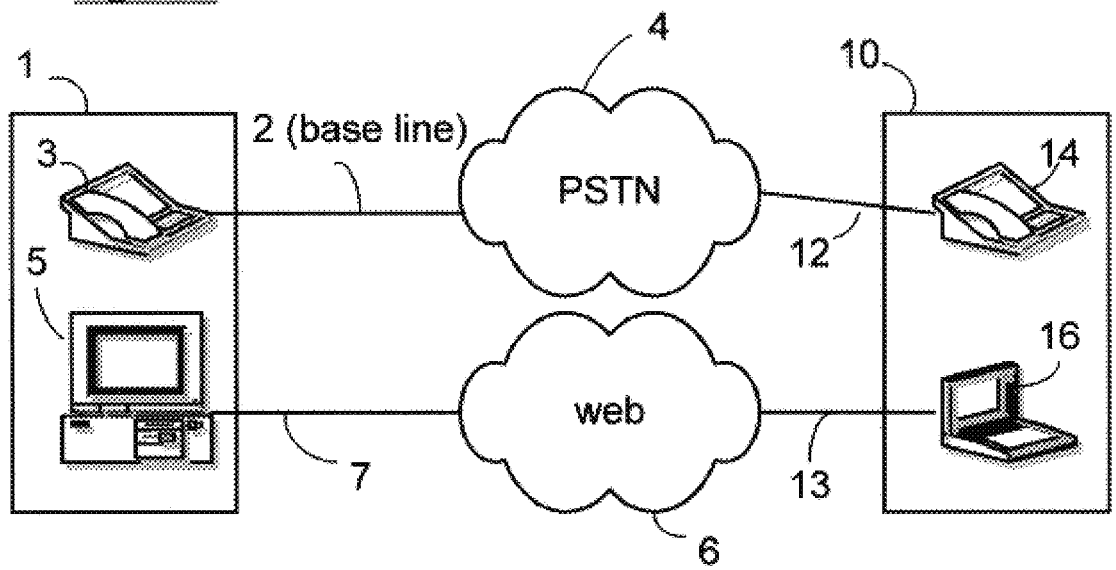
FIG. 1 is a schematic for explaining a PSTN need presently provided.
FIG. 2 is a chart contrasting functional capabilities of PSTN resource management intelligence with and without the present invention.

Presently conventional usage of the PSTN and networks external to the PSTN (e.g. the web) is suggested in FIG. 1, and the chart in FIG. 2 is used to explain how such usage pertains to PSTN services (call waiting, call forwarding, etc.). These figures are used to illustrate the presently recognized and satisfied (previously unrecognized and unsatisfied) need for providing users of the PSTN and networks external to the PSTN with extended telephone services deliverable through the external networks.

User premises 1 (office, home, etc.) connects to a telephone line 2 associated with a base telephone account as defined above. Premises 1 are normally occupied by an authorized user of the base telephone account. Hereafter, a telephone line such as 2 that is used by an authorized user of a base telephone account may be referred to as a base telephone line (or simply a base line). Base line 2 connects to analog telephone equipment 3 at one end and PSTN 4 at its other end. Telephone equipment 3 may be a conventional telephone, conventional facsimile communication apparatus, or a conventional combination of both. Computer 5, housed in premises 1, connects to external data communication network 6 (shown as the web) through line 7. Line 7 can be either a telephone line maintained by the PSTN or part of a private local or wide area network (LAN or WAN) having direct connections to the web. If line 7 is a telephone line, it can either coincide with or be physically separate from base telephone line 2.

If line 7 coincides physically and virtually with line 2, then telephone equipment 3 can be used for standard telephony functions only while computer 5 is not online (not actively connected to and communicating on external network 6), and telephone equipment 3 is unavailable for use while the computer is online.

Networks 4 and 6 are understood to be generally separate from each other, although they may have some common elements (e.g. common usage of line 2 for standard telephony and access to the web). These networks connect to remote premises 10, via lines 12 and 13; the latter either physically separate or used in time separation. Thus, line 12 may connect to analog telephone equipment 14 in premises 10, and line 13 may connect to computer 16 in the same premises. Line 12 may be a base telephone line for telephone users in premises 10. Line 13 may be a telephone line (one maintained by the PSTN) or a part of a private network external to the PSTN (e.g. a line connecting to a local or wide area private network). If line 13 is a telephone line coinciding with line 12, telephone equipment 14 can not be used while computer 16 is online and computer 16 and computer 16 may not be able to get online while equipment 14 is in use (off-hook).

As suggested in block 20 of the chart in FIG. 2, without the presently contemplated adaptation (of PSTN intelligence responsible for management of telephone services), telephone services assigned/charged to base line 2 are confined exclusively to the PSTN. Therefore, PSTN services constituting "extensions" of existing/standard telephone services could not be delivered by the PSTN through external networks such as the web.

As an example, if lines 2 and 7 of FIG. 1 are a common telephone line that is subscribed to "standard" call forwarding service, telephone calls directed internally through the PSTN to that line could be redirected to other telephone lines associated with telephone numbers specified by a user of line 2. However, such calls can not be redirected to computer 5 while the latter is connected online to the external network/web. Thus, premises 1 are effectively deprived of telephone call reception services while the computer is online.

Similarly, if lines 2 and 7 are a single physical line subscribed to standard call waiting, an indication of a waiting call could be delivered to standard telephone 3 (e.g. audible "clicks") while that instrument is in use, but similar indications could not be communicated while the computer is online. Similarly, if the common line is subscribed to standard caller ID, that service is effectively unavailable while the computer 5 is online. Thus, even with standard call waiting and caller ID, occupants of premises 1 would be unaware of waiting telephone calls, even calls having extreme urgency, while computer 5 is online.

Implied by the foregoing statements, and suggested explicitly in FIG. 1, computer 5 can communicate through the web with other computers anywhere in the world, including computer 16; but such communications are carried out in a context wherein telephone services furnished by the PSTN have no extended application to processes performed relative to the web.

Block 22 in FIG. 2 indicates that with the presently contemplated adaptation (of PSTN intelligence), extended forms of telephone services can be furnished by the PSTN to equipment linked to networks external to the PSTN; e.g. to computers linked to the web. Of particular interest presently is the furnishing of such extended telephone services to computers such as 5 which share use of a common line such as 2 with conventional telephones such as 3, with the effect that the latter instruments are deprived of telephone services while the computer is online. Types of extended telephone services that can be provided in this manner, and preferred implementations thereof, are described next.

Figure 3:
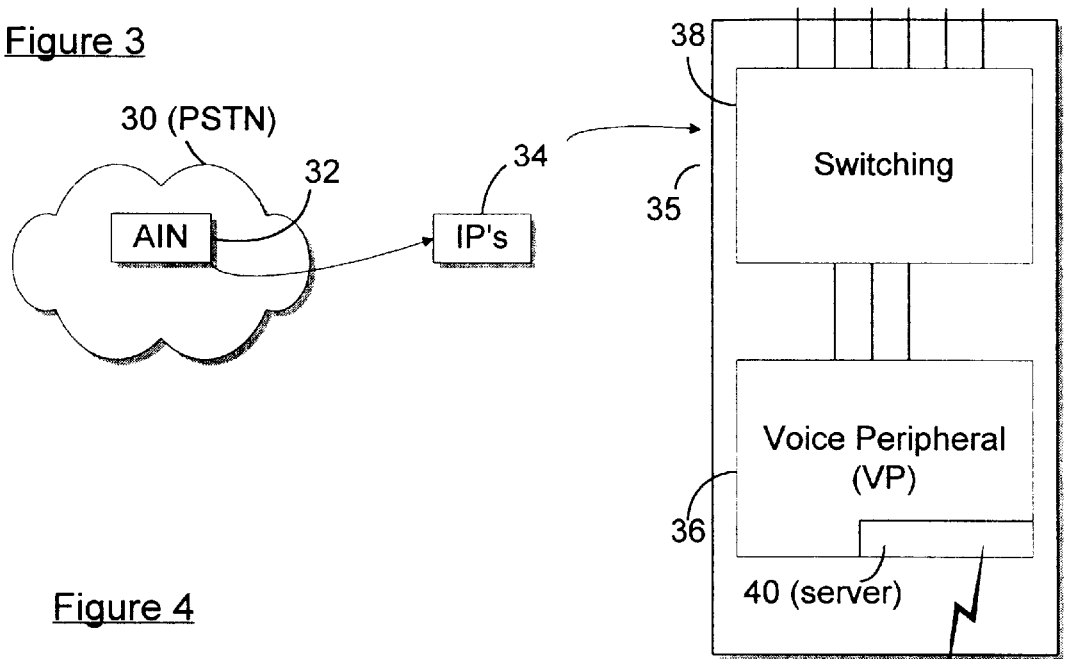
FIG. 3 is a schematic of a preferred system environment for implementation of the present invention.

FIG. 3 schematically illustrates resource management intelligence of the PSTN, configured in accordance with the distributed architecture disclosed in the application by Acker et al cross-referenced above. System complexes embodying such intelligence are located at regional nodes of the PSTN. Each (nodal) complex comprises a network of computers and switching gear configured in conformance with architectural principles of Advanced Intelligent Network (AIN) construction that have been widely adopted by telephone companies operating within the PSTN, In FIG. 3, the PSTN is indicated at 30, and an AIN complex within one of its regional nodes is represented at 32. AIN complex 32 contains an intelligent peripheral (IP) network indicated at 34. In general, as described by Acker et al in their copending application cross-referenced above, an IP network such as 34 comprises multiple processors intercommunicating through a network (e.g. a local area network or LAN privately maintained by the PSTN). The processors of the network have distinct functional responsibilities; call traffic routing being a principal responsibility of processors designated "call processors" and delivery of telephone services being a principal responsibility of processors designated "voice peripherals" (VP's) which are relevant to the delivery of presently contemplated extended telephone services.

As suggested at 35, network 34 contains one or more VP processors 36, communicating with a switch complex 38, (not shown) call processors, and a server processor 40. As shown at 42, server 40 connects to networks external to the PSTN (e.g. the web, the Internet, cable TV networks, etc) and may be referred to hereafter as the PSTN's "web server". Server 40 can be either a separate processor (separate from the VP's and call processors) or a shared part of one or more VP's 36.

Figure 4:
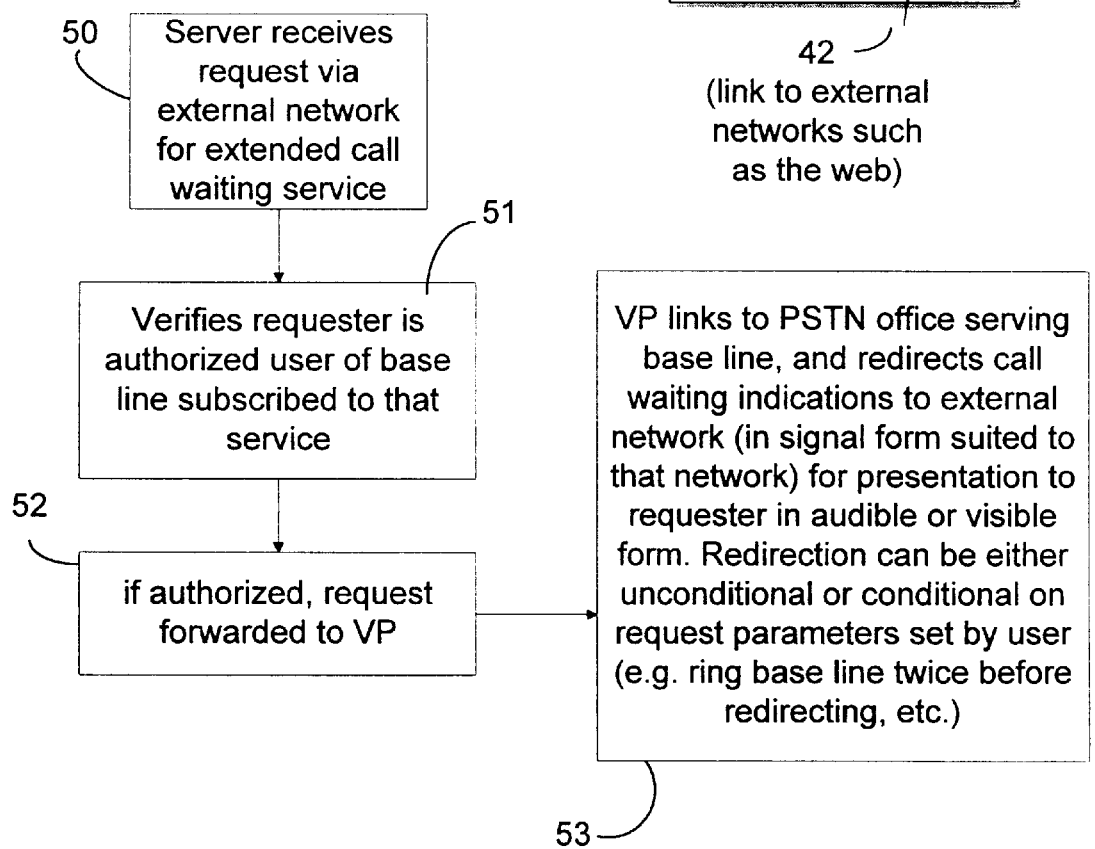
FIG. 4 is a high level flow diagram illustrating how the system of FIG. 3 can be functionally adapted to provide extended call waiting services of this invention.

FIG. 4 shows how the subsystem 35 of FIG. 3 can be functionally adapted to provide a particular type of extended telephone service—termed "extended call waiting"—that exemplifies a species of a genus of extended telephone services contemplated by the present invention. Other species of extended services are described later. In the example of call waiting service described next, it is assumed that a PSTN server such as 40 is linked to the web and that it and a VP such as 36 are specially adapted (e.g. have specially written program applications) for performing functions described next.

Extended call waiting is a type of service that is chargeable to a specific base telephone account associated with a specific base line such as line 2 (FIG. 1). Extended call waiting is a variation of standard call waiting (the standard service presently provided in the PSTN), but the extended version differs from the standard one in that is delivered only to authorized users of base accounts, usually through external networks such as the web, and in the latter circumstance usually through a server such as 40 that is part of an IP network or equivalent resource management intelligence within the PSTN.

All other presently contemplated extended services have similar usage; i.e. they are deliverable only to authorized users of base accounts, and generally via external networks and IP servers or equivalent elements of PSTN resource management intelligence.

Considering the web, delivery of extended call waiting service (and other extended services) generally will be initiated when a user of a "browser-equipped" computer signs on to the web and accesses a predetermined URL (Uniform Resource Locator) maintained by a PSTN web server. Typically, the URL would be pre-assigned to authorized users of base accounts within the local geographic region managed by the IP network (or equivalent intelligence) containing the server. At such times, a web page will be presented to the web user requiring the user to enter specific self-identification information. This information is forwarded to the web server, enabling the latter to verify that the web user is an authorized user of a base account within the server's local region. This verification process is suggested in block 51, FIG. 4.

If the web user is found to be an authorized user of a local base account, another web page is sent from the the web server to the user indicating, among other things, extended service options available to that party. One such indication may denote availability of extended call waiting service.

If extended call waiting is an available option, it can be activated by the web user (e.g. by "clicking" on the respective indication).

Web pages and indications consistent with the foregoing are presently state of the art for other web (and Internet) activities (i.e. activities other than accessing telephone services). When extended call waiting is activated, the server signals that occurrence to a VP responsible for delivery of the respective service (block 52, FIG. 4). The VP then communicates with local switching centers (e.g. 38, FIG. 3) to determine when a new telephone call is being directed to the base telephone line associated with the web user's base account. When a new call is found the switch port at which the call appears is recorded by the VP and extended call waiting signals are sent to the web user via the web server. These signals are digital signals causing a call waiting indication (either visible or audible) at the web user's computer (block 53, FIG. 4).

For reasons which will be explained later, an acceptance indication (usually visible) is also provided to the web user for enabling the latter to selectively signal acceptance of the waiting call (to the VP via the web server). The acceptance indication is generally used in conjunction with other extended services discussed later (extended caller ID and extended call transfer).

The web user's extended call waiting service may be delivered either unconditionally or subject to conditions stipulated by the user (block 53, FIG. 4). Usually, the conditional version would be used when the web user is operating remote from the premises containing a respective base telephone line, and the unconditional version would be used when the user is linked to the web through the base telephone line to which incoming calls would be directed. A representative condition suggested in block 53, FIG. 4, is to apply a predetermined number of rings to the user's base line and if the line remains inactive (the waiting call is not picked up there, e.g. by a co-occupant of the premises connected to that line) the extended indications are routed to the user through the web.

Figure 5:
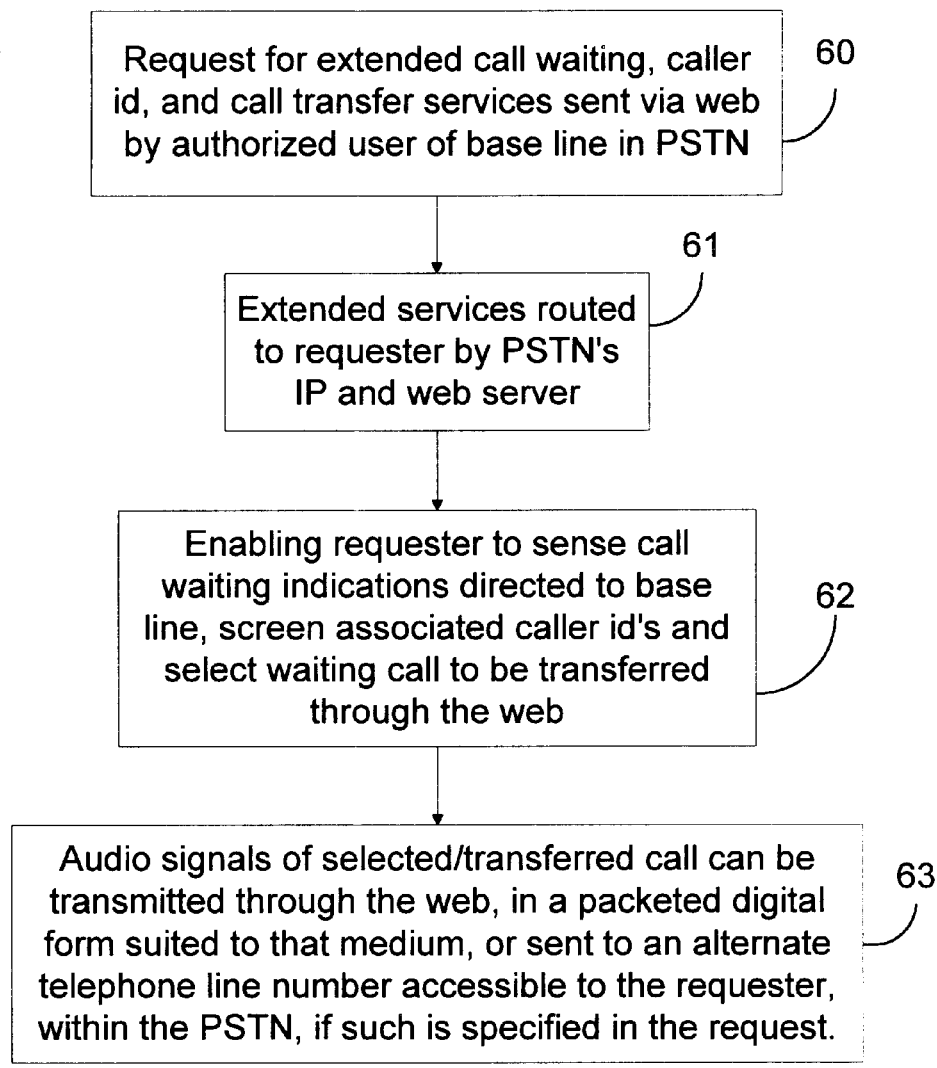
FIG. 5 is a high level flow diagram similar to that of FIG. 4 illustrating how the system of FIG. 3 can be adapted to provide multiple inter-related extended services.

FIG. 5 shows how the foregoing extended call waiting service can be used with particular advantages in conjunction with other extended services; specifically, in conjunction with "extended caller ID" and "extended call transfer" services. The extended caller ID service would enable its recipient to screen origins of waiting calls indicated by extended call waiting, and extended call transfer would allow the recipient to accept selected/screened calls and have the selected calls routed to the recipient's computer (of course, via the VP, PSTN web server and web).

In effect, extended caller ID, as presently contemplated, corresponds to standard caller ID (in which indications of waiting call origins are furnished to a telephone (analog or other) connected to a base line; but with the difference that it is delivered through an external network by means of intelligent rerouting actions of IP intelligence and a (web) server in the PSTN. Call origin indications delivered by extended caller ID are displayable directly at a computer linked to the web (i.e. they do not require any additional equipment, in contrast to equivalent indications of standard caller ID).

Extended call transfer, as presently contemplated, is similar in functional effect to standard call forwarding; but where calls rerouted by standard call forwarding are delivered to an alternate telephone number, which needs to be pre-specified by the user of the service, calls accepted with extended call transfer are routed to an online computer whose location is immaterial to the call route. In other words, where calls forwarded with standard call forwarding can incur distance charges and the like, calls rerouted by extended call transfer are treated the same whether their destination is local to or geographically remote from a respective base line. Another difference in extended call transfer via the web is that the signals of the transferred calls are converted between analog and compressed digital formats, the former typical of call signals usually handled within the PSTN and the latter typical of signals transmitted over the web.

Noting that a request for extended services, as presently contemplated, can apply to one or more services, block 60 in FIG. 5 illustrates an exemplary situation wherein an authorized user of extended services acts through the web to activate all three of the foregoing extended services (block 61, FIG. 5). Verification by the server that the user is an authorized one is implied but not explicitly stated in block 60.

In this situation, when the web user signals acceptance of a waiting call, subject to the screening afforded by extended caller ID, the accepted call is intercepted at a PSTN switch port and redirected to the web user (blocks 62–63, FIG. 5) by coordinated operations of IP intelligence and a web server in the PSTN. As suggested in block 63, audio signals of the redirected call can be transmitted through the web in a packeted (compressed) digital format traditional to that medium. Although not stated in this block, it is generally understood that audio signals in that form are convertible within a computer by an Internet Phone application; there being a number of such applications presently available commercially. Block 63 also suggests that the web user can be given an additional routing option, in respect to call transfer, wherein the extended service is handled as a standard call forward; i.e. the web user can provide the IP intelligence with the number of a telephone nearby and have the call routed as an analog call to that telephone (for example, a web user operating in a hotel room with two lines can use one line for web access and the other as a destination for forwarded calls).

Figure 6:
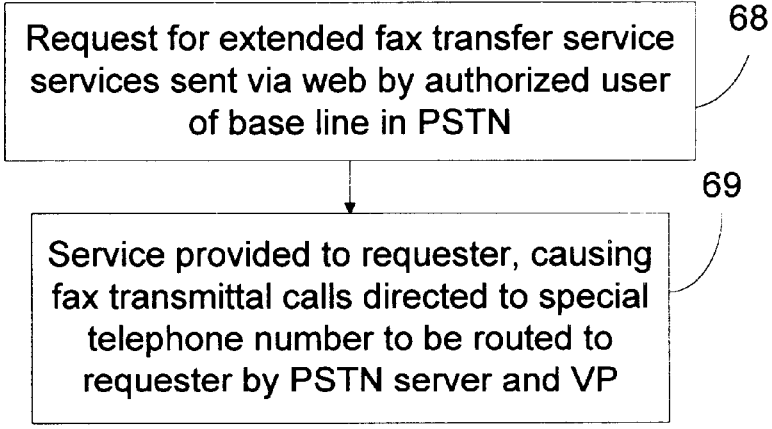
FIG. 6 is a high level flow diagram of an extended "fax transfer" service representing a variation of an extended "call transfer" service shown in FIG. 5.

A variation of extended call transfer service, presently termed extended fax transfer, is suggested in FIG. 6. Authorized users of this service would be given a special telephone number within their local call region (e.g. a number associated with a special base account dedicated to the service), and furnish that special number to parties desiring to communicate facsimile materials. The authorized user could then access the PSTN web site, as for the other extended services, and indicate/request activation of a fax transfer option after having been identified as an authorized user of such (block 68, FIG. 6).

When a facsimile call is directed to the special number, the call is intercepted and routed to the authorized user's computer (on the web), the interception and routing being performed by IP intelligence and a web server in the PSTN (block 69, FIG. 6). In this instance, it is understood that the signals sent to the web would be converted to a compressed digital form compatible with that medium and either immediately displayed and printed or saved at the receiving computer. It also should be understood that an authorized user of this service need not have any special facsimile receiving equipment in addition to a computer (i.e. this could be an economical service for a web user who does not have a special purpose facsimile receiver). It also should be understood that the re-routed facsimile image can be converted to HTML (hypertext markup language) format now traditionally used for displaying web page materials (by the IP intelligence in the PSTN), so that the material is presented to the authorized user in the pleasing form associated with that format.

A contemplated variation or option for this extended fax transfer service would be that if calls are waiting at the special number, but the authorized user is not currently on-line, the image could be saved by the IP intelligence (VP) as a form of web e-mail and presented to the authorized user when the latter signs on to the appropriate PSTN web site. Other variations of this options will readily occur to those skilled in the relevant arts.

In respect to each of the foregoing examples of extended service handling, it should be understood that the request for such service(s) can originate anywhere in the world, since the web is ubiquitously accessible everywhere; e.g. at a computer in a city or country remote from the requester's base line premises (e.g. premises 1, FIG. 1), at a computer within the requester's base line premises, and even at a computer that is actively connected to a web/Internet access provider through the respective user's base telephone line.

Details of operations required to deliver the foregoing extended services are understood by considering the following discussions of FIGS. 7a to 7g and 8. It is understood that such operations are performed cooperatively by a VP (voice peripheral) such as 36 and server such as 40 (FIG. 3) or equivalent intelligence of the PSTN (e.g. other elements of an intelligent peripheral of a type required by AIN architecture). It is understood further that the operations to be described usually will be performed at a regional node in the PSTN locally maintaining the base telephone account of the party receiving the respective extended service.

FIGS. 7a to 7g considered together constitute a flow diagram of operations involved in delivery of extended call transfer service. In this service, telephone calls directed to a base telephone line are conditionally rerouted to the user via the web and appropriate application software on the user's computer (e.g. any of today's commercially available "Internet Phone" type applications).

Operations described in this diagram are considered also to be representative of operations required for delivery of extended call waiting and extended caller ID services that are useful for screening calls selected for extended call transfer as explained earlier.

FIG. 7a illustrates operations performed when a party on the web logs on to a PSTN web server (the latter representing the web interface maintained by the PSTN for that party's base telephone account). As noted earlier, the party logging on accesses a web (or Internet) "home" (or starting) page maintained by a PSTN server in the local telephone calling region normally serving that party (operation 80, FIG. 7*a*). The home page contains selectable entries (e.g. hyperlinked text selectable by clicking a mouse cursor on them), these entries effectively constituting (or referencing) a form which the logging party completes for identification purposes. Using the entered information, the (PSTN's web) server verifies that the party is an authorized user of a base account within the geographic jurisdiction of that server (operation 82, FIG. 7*a*). It is understood that if the logging party is not an authorized user further access to PSTN functions is denied. It is understood further that in this particular instance, the logging party has effectively requested enablement of extended call transfer service. It is understood also that the verification operation suggested at 82 requires the server to either have a copy of the local PSTN authorized user database or to communicate with other elements of the respective AIN network to obtain the needed information. Finally, it is understood that the logging party may be anywhere in the world in relation to the local region of the web server when this process occurs; i.e. the logging party may be accessing the web via a respective local base telephone line, or via a telephone or other line geographically remote from a respective local base line, and that circumstance is effectively immaterial to the PSTN services performed and charges applied thereto.

After verifying that the logging party is an authorized user of a base account entitled to extended call transfer service, PSTN intelligence (in this instance, the VP responsible for delivery of telephone services to the base account) monitors switching centers within the local region for new telephone calls directed to the base telephone line (at home, office or mobile phone associated with the base account) of the respective authorized user (decision/action point 84, FIG. 7*a*). If no such new calls are pending, the VP and server effectively idle, while the web party's (authorized user's) computer receives a page image indicating extended services, including extended call transfer, currently being provided to that user (86, FIG. 7*a*). If a new incoming call to the user's base line is detected ("yes" exit fiom action point 84), the call information handling process starting at 90 (FIG. 7*b*) is evoked.

In the latter process, the PSTN intelligence checks to make sure that the user of extended call transfer service is still online (still connected via the web to the PSTN's web server) as suggested at 92 (FIG. 7*b*). If the user has disconnected from the web server at this time, standard ringing and call connecting operations 94 are performed relative to the user's base line. That is, the base line is rung until either the call is answered (a conventional telephone or telephone answering device goes offhook) or the incoming call is terminated (caller hangs up). An additional voice-mail option, suggested by actions 96 and 98, routes the incoming call to a centralized voice mail facility maintained by the VP handling the services after a predetermined number of unanswered rings ("ring count") have been applied to the base line. In this option, if the number of unanswered rings to the base line is equal to or less than the predetermined number ("no" exit at decision 96), the base line ringing process continues, but when the ring count is exceeded ("yes" at 96) the standard voice mail function is initiated (action 98) with delivery of a recorded announcement to the calling party and opportunity given to that party to leave a voice message.

Returning to consideration of decision action 92, if the authorized user is still online when the incoming call is detected ("yes" at 92), continuing call processing functions are evoked (refer to FIG. 7*c*) starting at 100. In this stage of call handling, PSTN intelligence in the user's local service region (e.g. the VP) determines if the user has stipulated conditions on delivery of the extended call transfer function; e.g. a requirement to have a predetermined number of standard rings applied to the user's base line before the call is routed to the user through the web.

Figure 7C:
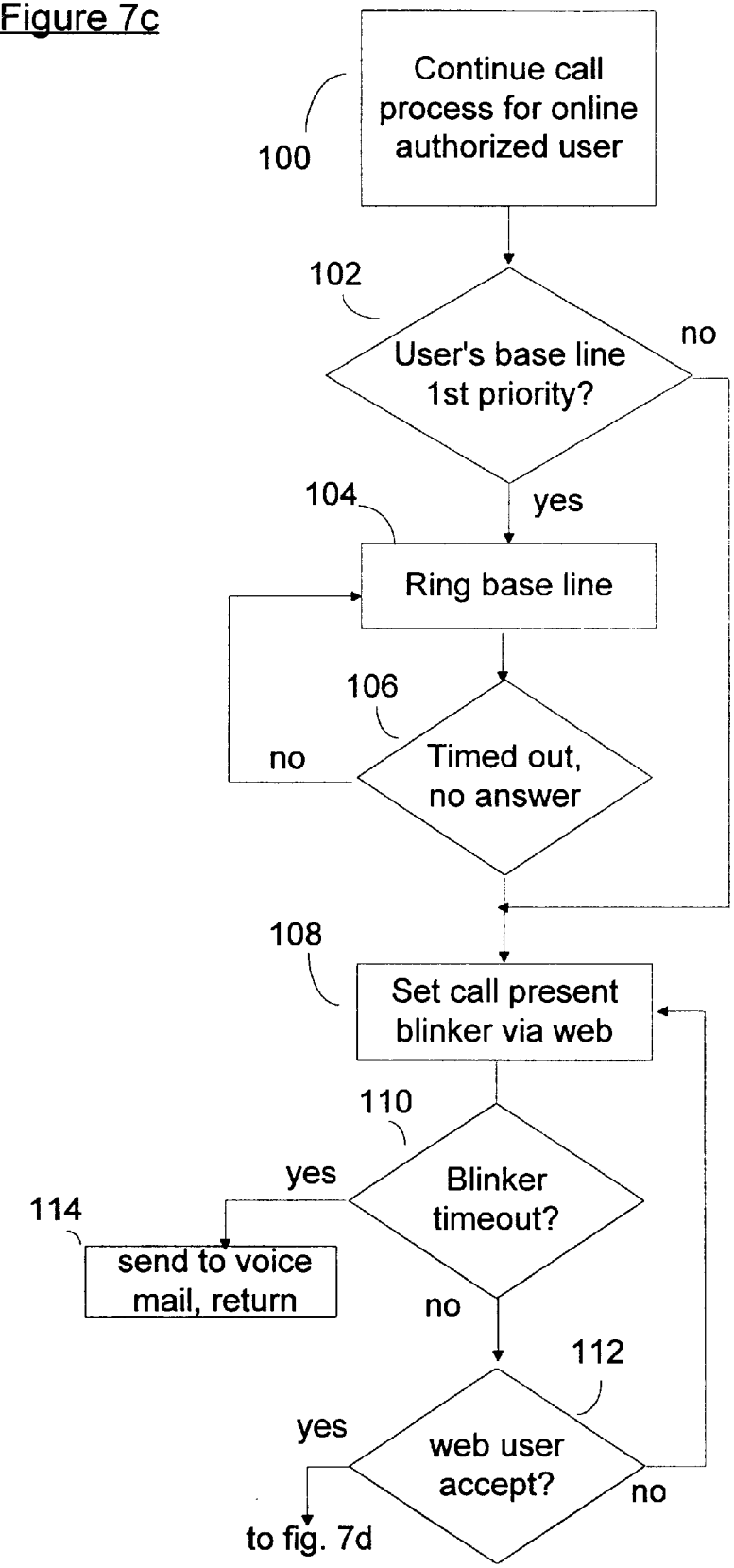

If local ringing conditions are applicable ("yes" at decision 102, FIG. 7*c*), the local base telephone line is rung until either the call is locally answered at the base line (by a conventional telephone device going "off-hook") or a limit number of local rings pre-specified by the user have been applied (actions 104, 106 FIG. 7*c*). If local conditions are either inapplicable ("no" at 102) or have been fulfilled without a standard local response ("yes" at 106), a "call present" indication is given to the user's computer via the web as shown at 108. This indication can be provided e.g. in the form of a blinking "call present" icon on the user's computer monitor as shown. What happens next is up to the user and indicated by decision functions 110 and 112.

If the blinker function has not timed out ("no" at 110 and the user has not accepted the call ("no" at 112), the blinker presentation continues. If the "blinker" function times out without action by the user ("yes" at decision 110), application of extended call transfer service to the waiting call may be discontinued. An additional option suggested at 114 routes the incoming call to a standardized PSTN voice mail service, if that standard option is applicable and a blinker timeout has occurred. On the other hand, if the user accepts the incoming call ("yes" at 112, manifested e.g. by the user clicking a mouse button while pointing to the blinker with the latter having a hyper-linked association to acceptance), the call interception and conversion/streaming process starting at 120 in FIG. 7*d* is evoked by the PSTN intelligence.

In this process, a call connection is established between the calling party and the called party/authorized user (action 122, FIG. 7*d*). This connection generally runs through a port on PSTN switches ("switch port"), the VP or other PSTN intelligence, the PSTN web server, the web and (a telephone call handling application in) the authorized user's computer. With the connection established, the conversion/streaming process is initiated at 124 (FIG. 7*d*) to convert analog voice signals from the caller to a compressed digital form suited to web transmission and to convert voice signals from the called party, in compressed digital form, to an analog form appropriate for transferral to the caller through the PSTN switch port.

This conversion/streaming process—indicated at 124.1 to 124.5 in FIG. 7*d*—continues until both parties have hung up. Monitoring for that occurrence is at decision action 126 FIG. 7*d*. If one or both parties are still connected ("no" at 126) the streaming process continues via actions 124 and 14.1 to 124.5. When both parties have disconnected ("yes" at 126) the conversion process ends (action 128) and a disconnection process is performed, the latter process shown in FIG. 7*g*.

The streaming conversion process begins at 124.1 FIG. 7*d*. This process has transmit and receive phases associated respectively with conversion of analog voice signals being transferred from the PSTN switch port to the authorized user via the web and conversion of digital voice signals being transferred from the authorized user to the PSTN switch port via the web. The transmit phase is indicated at 1242 and 124.3 (FIG. 7d), and the receive phase is indicated at 124.4 and 124.5 (FIG. 7d).

Figure 7E:
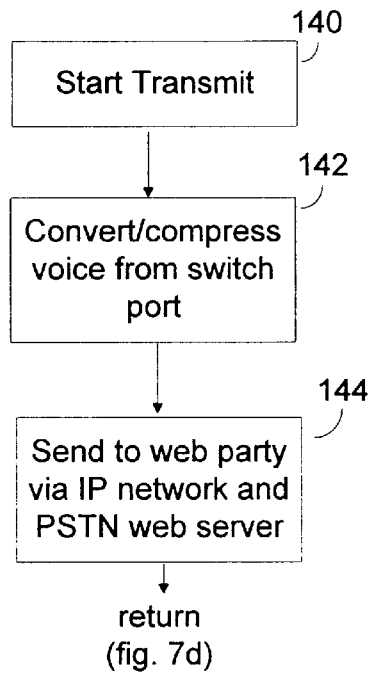

In the transmit process, the VP (or other PSTN intelligence) determines at 124.2 if a transmit request is active (i.e. if analog signals at the switch port have changed since their last sampling, conversion and web transfer). If a transmit request is not active, the receive phase is started at 124.4. If a transmit request is active, the transmit process 124.3 is performed. Details of the latter process are shown in FIG. 7e beginning at 140 in that figure. Analog signals at the switch port are sampled periodically (at a rate sufficient to be able to properly reproduce the voice), converted to digital form and saved cumulatively in that form (operations 142). When enough digital signals have been accumulated to complete a "packet" (usually, composed of hundreds or thousands of individual samples) they are sent to the server in a burst (i.e. time compressed) form and transmitted by the latter to the authorized user's computer via the web (operations 144).

Figure 7F:
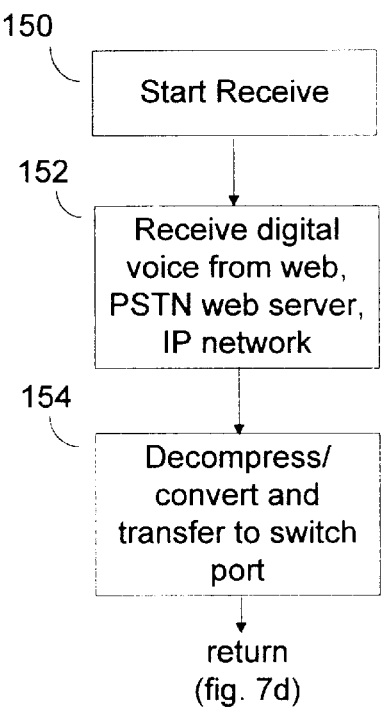

In the receive process, the VP (or other PSTN intelligence) determines at 124.4 if a receive request is active (i.e. if a packetized burst received from the web has not been fully converted, retimed and sent to the switch port). If a receive request is not active, action 126 is performed and the conversion phases are repeated if both parties have not disconnected. If a receive request is active, the receive process 124.5 is performed. Details of the receive process are shown in FIG. 7f beginning at 150 in that figure. Digital signals received from the web, representing time-compressed voice samples, are converted to analog form, retimed to uncompressed form and applied to the switch port in the last form (operations 152 and 154).

Figure 7G:
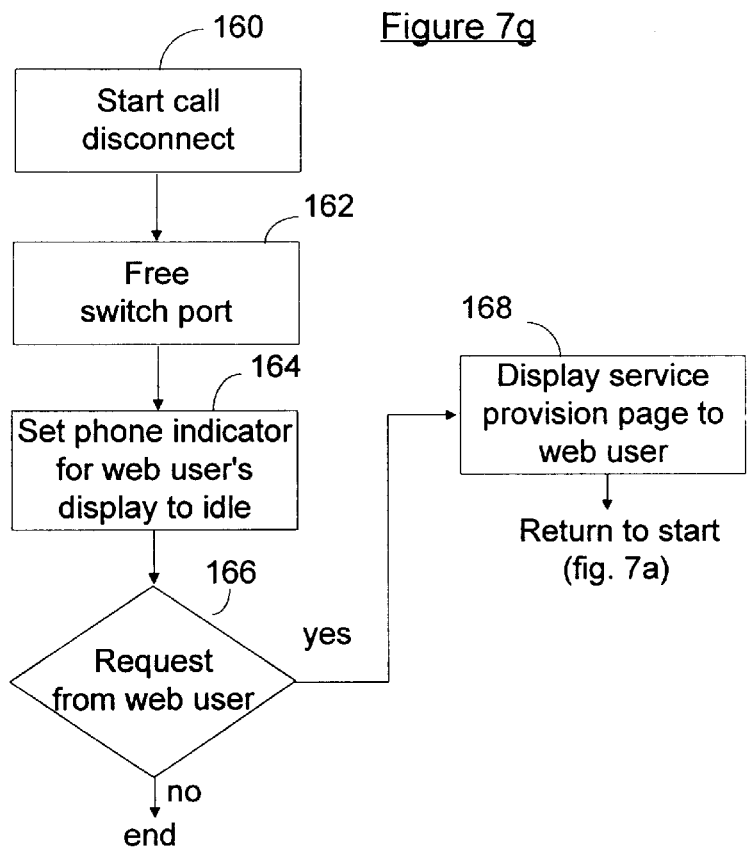

When both parties have disconnected ("yes" at 126, FIG. 7d) action 128 is taken to invoke the terminating process shown in FIG. 7g, starting at 160 in that figure. In this process, the switch port is freed up (i.e. rendered available for another call connection) as suggested at 162, and the authorized user's computer display is modified to indicate that the telephone call application at the computer is now idle (action 164). If the user is still connected to the web server ("yes" at decision 166), the initial page indicating the extended services currently active is displayed to that user (operation 168), and the processes described heretofore are repeated starting at FIG. 7a. It is understood that the page presentation indicated at 168 can be accomplished either by sending a full page to the user's web browser or by signalling the browser to restore a page previously cached in the user's computer.

It should be appreciated that the extended call waiting and extended caller ID services previously discussed can be performed by actions similar to but simpler than those described above;

such actions serving to intercept analog signal functions representing activity at a PSTN switch port [in the case of extended call waiting, signal functions denoting one or more pending calls, and in the case of extended caller ID signal functions denoting origin(s) of (a) pending call(s)], and to transfer corresponding activity indications to the respective authorized user's computer in digital form via the web.

Figure 8:
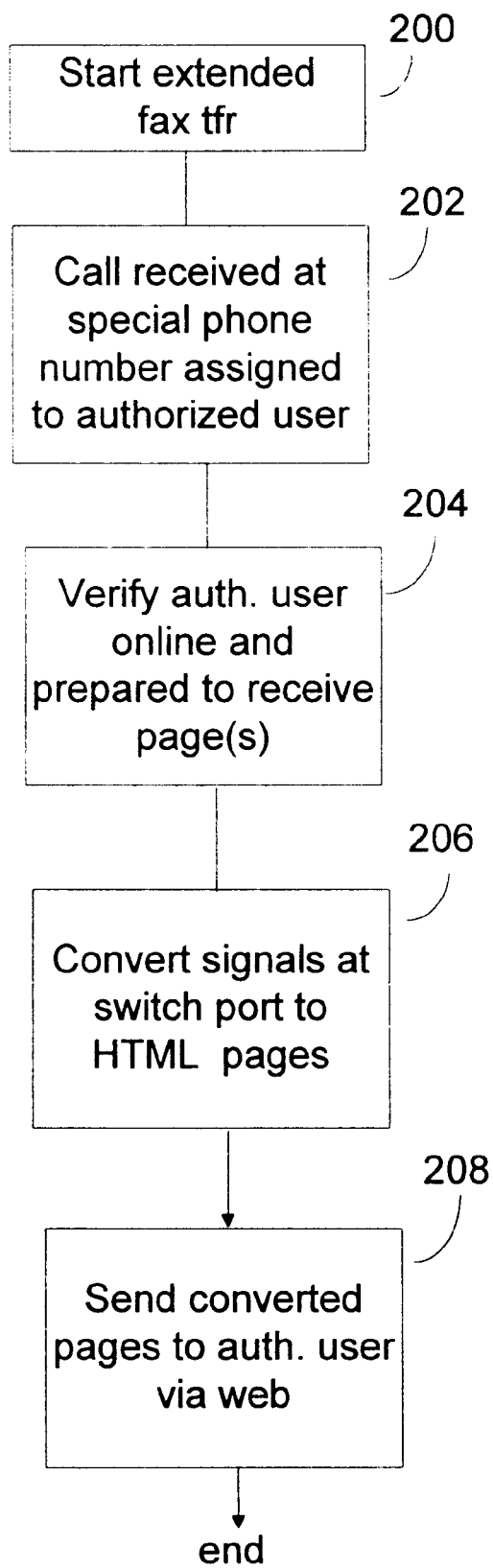
FIG. 8 is a flow diagram showing details of implementation of "extended fax transfer", a service suggested in FIG. 6.

FIG. 8 shows how the extended fax transfer service (suggested in FIG. 6) is implemented. This process, which starts at 200, involves receipt of a "local" telephone call to a special "local" telephone number preassigned to the authorized user of the service (operations 202), which number is given by that party to other parties desiring to transmit facsimile images to that user by means of ordinary analog facsimile transmission equipment. Although the reception of the call (detection of a ring directed to the special preassigned number) does not explicitly indicate to the PSTN that the call involves facsimile transmission, that fact is assumed when the call is detected.

When a call to such a special number is detected, the PSTN intelligence (e.g. VP) verifies that the authorized user of the respective service is online (actively connected to the PSTN's web server) and ready to receive web pages representing transmitted facsimile images (operations 204). Assuming that the user is online and ready, the incoming call is accepted by the PSTN intelligence and signals of that call are received, converted to a digital form, stored and eventually transferred to the authorized user via the web. The reception and conversion are indicated at 206 and the transfer to the authorized user is indicated at 208. As indicated at 206, the conversion may be used to change received signals (e.g. analog signals representing bit-mapped elements of a scanned image) to signals arranged in HTML (hypertext markup language) format generally used for presentation of web pages. The converted images can be sent (downloaded) to the user either as they are created or delivered at the user's request. At the user's computer, downloaded images may be either immediately displayed or they may be stored (e.g. in cached hard disk files designated by the web server and the user's browser) and displayed at the user's request (by actions of only the user and the user's browser). Furthermore, stored images may be printed at a printer attached to the user's computer; by actions of only the user and user's browser.

Notice that in the foregoing image handling process, the images could be received and stored in the user's computer even if the user were not present at the computer when that occurred, and the printing of the transferred images is not only optional for the user but also represents a method for creating hard copy images of transmitted facsimile which requires neither analog facsimile receiving equipment at the user's location nor a special facsimile ("fax modem") application running on the user's computer (although applications of this type are state-of-the-art they may be difficult if not impossible to use while the user's computer is connected to the web).

What is claimed is:

1. A system for adapting resource management intelligence of the public switched telephone network (PSTN) to deliver extended telephone services associated with predetermined telephone lines interfacing to said PSTN, through a public data communication network external to said PSTN, to authorized subscribers to said extended services, each said subscriber being entitled to receive predetermined extended services relative to telephone calls directed to an associated telephone line, while the respective subscriber is linked to said resource management intelligence through said external data communication network; said services enabling a said subscriber to instantly and variably control handling within said PSTN of telephone calls directed to a respective associated telephone line without disconnecting from said external data communication network; said adapting system comprising:

a server administered by said resource management intelligence of said PSTN, said server connecting said resource management intelligence to said external data communication network; said external network encompassina the Internet and World Wide Web (web), and being subject to access by equipment other than standard voice and facsimile telephone instruments; said other equipment including digital computers; said server being adapted to communicate with subscribers to said extended services through respective said associated telephone lines and said external data communication network; each said associated telephone line being available for dual usage at different times, one of said dual usages being to connect standard telephone instruments to said PSTN and a second dual usage being to connect said other equipment to said external data communication network via said PSTN; said server including means for determining through communication with a user of said external network if said user of said external network is an authorized subscriber to said extended services in relation to a respective said associated telephone line; and an applicational adapter constituting a data processing component of said resource management intelligence; said adapter being adapted to cooperate with said server and other components of said resource management intelligence to deliver said extended telephone services to each said user who is determined to be a said authorized subscriber; said services being subject to delivery to the respective authorized subscriber through said server, said external network and said respective associated telephone line, while the respective subscriber is continuously linked to said external network and said server; said delivered services enabling the respective authorized subscriber to variably control handling of telephone calls instantly directed to the respective associated telephone line without disconnecting from said external network and said server.

2. A system in accordance with claim 1, wherein a said associated telephone line available for said dual usage is connected to a building structure occupied by the respective subscriber to said extended services, and is subject to connection within said structure to both said standard telephone instruments and said other equipment.

3. An adapting system in accordance with claim 2 wherein said extended services include variations of standard telephone services directly deliverable to any of said respective associated lines having dual usage through transmission paths entirely internal to said PSTN.

4. An adapting system in accordance with claim 3 wherein said extended telephone services include an extended call waiting service for indicating, at a computer connected to said server via said external network and said respective associated line having dual usage, that standard telephone call activity directed to said line is instantly being processed within said PSTN.

5. An adapting system in accordance with claim 4 wherein said extended telephone services include an extended caller ID service for indicating origins of said standard call activity waiting for connection to said respective line, and thereby providing a basis for enabling a said authorized subscriber to the respective extended caller ID service to assess the importance and urgency of said waiting call activity.

6. An adapting system in accordance with claim 3 wherein said extended telephone services include an extended call forwarding option for rerouting telephone calls directed to a said associated telephone line having said dual usage, through said PSTN server and said external data network, to effectively connect said rerouted call to a said computer connected to said associated line; and wherein said rerouted call is transferred in a digital form compatible with operations of said external network and said computer.

7. A system in accordance with claim 6 wherein said external data communication network extends across the world wide web and Internet and signals of said rerouted calls are converted between a format standard to internal signal handling of the PSTN and a digital format common to said web and Internet, said digital format being compatible with software telephone applications for said web and Internet.

8. An adapting system in accordance with claim 3 wherein said extended telephone services include an extended call forwarding service for redirecting a call instantly directed to a said associated telephone line to a voice message recording system maintained by the PSTN for said associated line, and for delivering voice messages stored by said voice message system in behalf of the associated line to a said computer connected to said PSTN through said associated lines said external network and said server.

9. An adapting system in accordance with claim 3 wherein said extended telephone services include a facsimile call redirecting service for detecting and redirecting telephone facsimile communications directed to a said associated telephone line; wherein said redirected facsimile communications are redirected from internal switches of said PSTN to a said associated computer through said associated telephone line having dual usage, said external data communication network, and said server; and wherein said redirected facsimile communications are converted within said PSTN to a digital form compatible with said external data network before being passed from said server to said external network.

10. An adapting system in accordance with claim 9 wherein said converted facsimile communications are required to be directed to a predetermined telephone number pre-assigned to the authorized subscriber using the respective extended call forwarding service.

11. A system in accordance with claim 9 wherein said converted facsimile communications consist of digital signals in an HTML (hypertext markup language) format representing computer-displayable page images of a type commonly displayed by computer web browser applications.

\* \* \* \* \*